United States Patent
Tojyo

(10) Patent No.: US 7,029,262 B2
(45) Date of Patent: Apr. 18, 2006

(54) METHOD AND APPARATUS FOR MAKING PELLETS OF WOOD MEAL COMPOUND

(75) Inventor: Makoto Tojyo, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 361 days.

(21) Appl. No.: 10/134,615

(22) Filed: Apr. 30, 2002

(65) Prior Publication Data

US 2002/0185771 A1  Dec. 12, 2002

(30) Foreign Application Priority Data

May 2, 2001 (JP) .............................. P2001-134918

(51) Int. Cl.
*B29C 47/38* (2006.01)

(52) U.S. Cl. ..................... 425/198; 425/202; 425/203; 425/204; 425/382.4; 264/211.23

(58) Field of Classification Search .............. 425/198, 425/202, 203, 204, 289, 382.3, 382.4; 264/141, 264/142, 211.23, 211.21
See application file for complete search history.

(56) References Cited

U.S. PATENT DOCUMENTS

| | | | | |
|---|---|---|---|---|
| 3,480,997 A | * | 12/1969 | List | 425/144 |
| 4,217,083 A | * | 8/1980 | Machuque | 425/198 |
| 4,863,363 A | * | 9/1989 | Haring | 425/204 |
| 4,863,364 A | * | 9/1989 | Grimminger et al. | 425/208 |
| 5,000,900 A | * | 3/1991 | Baumgartner | 264/211.23 |
| 5,055,027 A | * | 10/1991 | Sato | 425/197 |
| 5,250,249 A | * | 10/1993 | Garner | 264/176.1 |
| 5,811,048 A | * | 9/1998 | Dunn et al. | 264/177.11 |
| 6,270,703 B1 | * | 8/2001 | Wildman et al. | 264/39 |
| 6,479,002 B1 | * | 11/2002 | Becker et al. | 264/148 |

FOREIGN PATENT DOCUMENTS

JP  2001-129870  5/2001

* cited by examiner

*Primary Examiner*—Mark Eashoo
(74) *Attorney, Agent, or Firm*—Sughrue Mion, PLLC

(57) ABSTRACT

A method and apparatus for making pellets of wood meal compound according to the present invention is constructed in such a manner that synthetic resin material and wood meal material are supplied into a hopper (3) in a most upstream position, and kneaded in a long kneading section (6) having no side feeder (2), thereby to obtain pellets from mixed material having more uniform properties than in the prior art.

3 Claims, 2 Drawing Sheets

METHOD AND APPARATUS FOR MAKING PELLETS OF WOOD MEAL COMPOUND

The present application is based on Japanese Patent Application No. 2001-134918, which is incorporated herein by reference.

BACKGROUND OF THE INVENTION

1. Field of the Invention

The present invention relates to a method and apparatus for making pellets of wood meal compound, and more particularly to a novel improvement in which synthetic resin material and wood meal material are supplied into a hopper without employing a side feeder, and as the results, the material can be sufficiently kneaded in a kneading section which is longer than in the prior art, without increasing a total length of the apparatus, thus enhancing properties of the product.

2. Related Art

As a conventional cutting device for the wood meal compound in which wood meal is used as material for mixture, the following art has been already disclosed in Japanese Patent Publication No. 2001-129870A. Specifically, designated by reference numeral 30 in FIG. 3, is an apparatus for making pellets of wood meal compound employing a twin screw type kneading and extruding machine 1. In a side area of this twin screw type kneading and extruding machine 1, there is provided a screw type side feeder 2. The above mentioned twin screw type kneading and extruding machine 1 includes a drive mechanism 31 connected thereto in a most upstream position, and further includes in series in a distal end direction, in other words, in a downstream direction, a resin supply hopper 3, a first kneading section 4, a screw type side feeder 2, a degassing cylinder 5, a second kneading section 6, and an open vent section 7 each of which is composed of a single cylinder block, a vacuum drawing vent section 8 composed of three cylinder blocks, an extruding section 9 composed of two cylinder blocks, and a die 10.

In the apparatus 30 for making pellets of wood meal compound constructed as described above, after those cylinders in the respective sections of the twin screw type kneading and extruding machine 1 have been heated up to a predetermined temperature, the drive mechanism 31 is actuated to rotate a twin screw 1a in order to supply the synthetic resin material from the resin supply hopper 3.

On the other hand, in the side feeder 2 too, a drive mechanism 2a is actuated to rotate a screw 2b in order to supply the wood meal material in a form of flour. This wood meal material is transported through the second kneading section 6 to in a distal end direction by means of the rotating screw 2b, heated up together with the synthetic resin material, and kneaded and melted by the heat and by shearing action of the rotating twin screw 1a.

The wood meal material and the synthetic resin material which have been kneaded and melted pass through the degassing cylinder 5, then kneaded and melted in the second kneading section 6, and thereafter, extruded from the die 10 through the open vent section 7, the vacuum drawing vent section 8, and the extruding section 9. This die 10 constitutes a part of a cutting device 100, and the composite resin material formed in a rod-like or a sheet-like shape will be cut and pelletized through this die 10.

Since the conventional method and apparatus for making pellets of wood meal compound have had the above described structure, there have been such problems as described below.

In particular, because there has been provided the side feeder for supplying the wood meal material in a side area of the twin screw type kneading and extruding machine, the respective kneading sections have had a small number of blocks, and consequently, kneading degree has been insufficient, resulting in low strength of the produced composite resin material. Moreover, the wood meal material has been added to the synthetic resin material which had passed the first kneading section, to be mixed and kneaded in the second kneading section. However, the synthetic resin material in a semi-melted condition is low in viscosity and weak in shearing action to be applied by the screw, which leads to insufficient kneading and dispersion of the added wood meal material. As the results, a non-uniform composite resin material which has low strength has been produced.

SUMMARY OF THE INVENTION

The present invention has been made in order to solve the above described problems, and an object of the invention is to provide a method and apparatus for making pellets of wood meal compound, in which synthetic resin material and wood meal material are supplied into a hopper without employing a side feeder, and as the results, the material can be sufficiently kneaded through a kneading section which is longer than in the prior art without increasing a total length of the apparatus, thus enhancing properties.

A method for making pellets of wood meal compound according to the present invention is characterized by comprising steps of supplying synthetic resin material and wood meal material to a hopper provided in a most upstream position of a twin screw type kneading and extruding machine, removing gas and water content from the material by a degassing cylinder provided downstream from the hopper, kneading the material in a kneading section provided downstream from the degassing cylinder, removing volatile content and water content from the kneaded material by an open vent and a vacuum drawing vent, and thereafter, pelletizing the obtained wood meal compound by a cutting device in a most downstream position of the screw type kneading and extruding machine. Moreover, the method is characterized in that the wood meal material includes flour of wet wood meal. Further, the method is characterized in that an outer diameter of a kneading disc in the kneading section is varied according to viscosity of the synthetic resin material.

An apparatus for making pellets of wood meal compound according to the present invention which comprises a twin screw type kneading and extruding machine which includes a hopper in a most upstream position, and further includes in a downstream direction from the hopper, a degassing cylinder, a kneading section, an open vent, a vacuum drawing vent, and a cutting device, is constructed in such a manner that synthetic resin material and wood meal material are supplied to the hopper to be kneaded in the kneading section. Moreover, the apparatus is so constructed that the apparatus comprises a die holder and an adapter provided in an upstream position of a die of the cutting device, and a breaker plate provided between the adapter and the die holder, and that a twin screw of the twin screw type kneading and extruding machine passes through the adapter and the breaker plate, and a distal end of the twin screw passes through the die holder to be guided into the die.

DETAILED DESCRIPTION OF THE PREFERRED EMBODIMENTS

Figure 1:
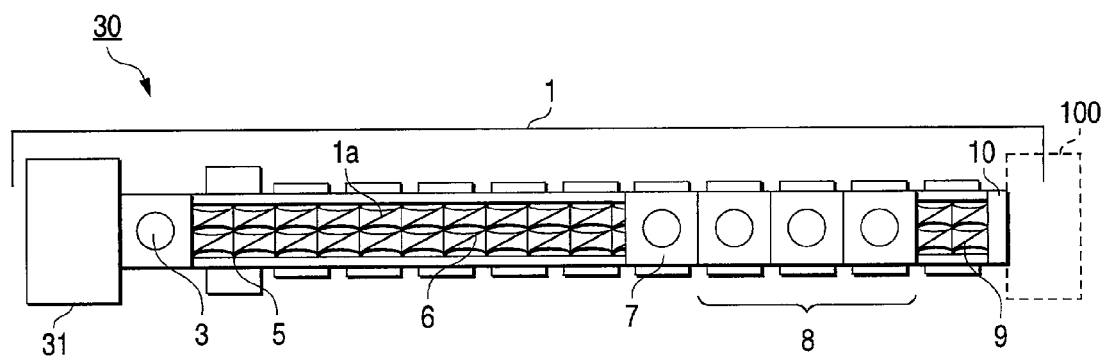
FIG. 1 is a plane view partly in section showing an apparatus for making pellets of wood meal compound according to the present invention.

Now, a preferred embodiment of the method and apparatus for making pellets of wood meal compound according to the present invention will be described referring to the drawings. It is to be noted that the same or similar parts as in the conventional example will be explained using the same reference numerals.

FIG. 1 shows an apparatus 30 for making pellets of wood meal compound according to the present invention. Designated by reference numeral 1 is a twin screw type kneading and extruding machine, and this twin screw type kneading and extruding machine 1 includes a drive mechanism 31 connected to its one end, and further includes in series from a most upstream position in a distal end direction, in other words, in a downstream direction, a resin supply hopper 3, a degassing cylinder 5 composed of one cylinder block, a kneading section 6 composed of five cylinder blocks, an open vent 7 composed of one cylinder block, a vacuum drawing vent section 8 composed of three cylinder blocks, an extruding section 9 composed of one cylinder block, and a die 10 to which a cutting device 100 is connected. A twin screw 1a positioned in the above mentioned kneading section 6 is composed of a weak kneading screw.

Figure 2:
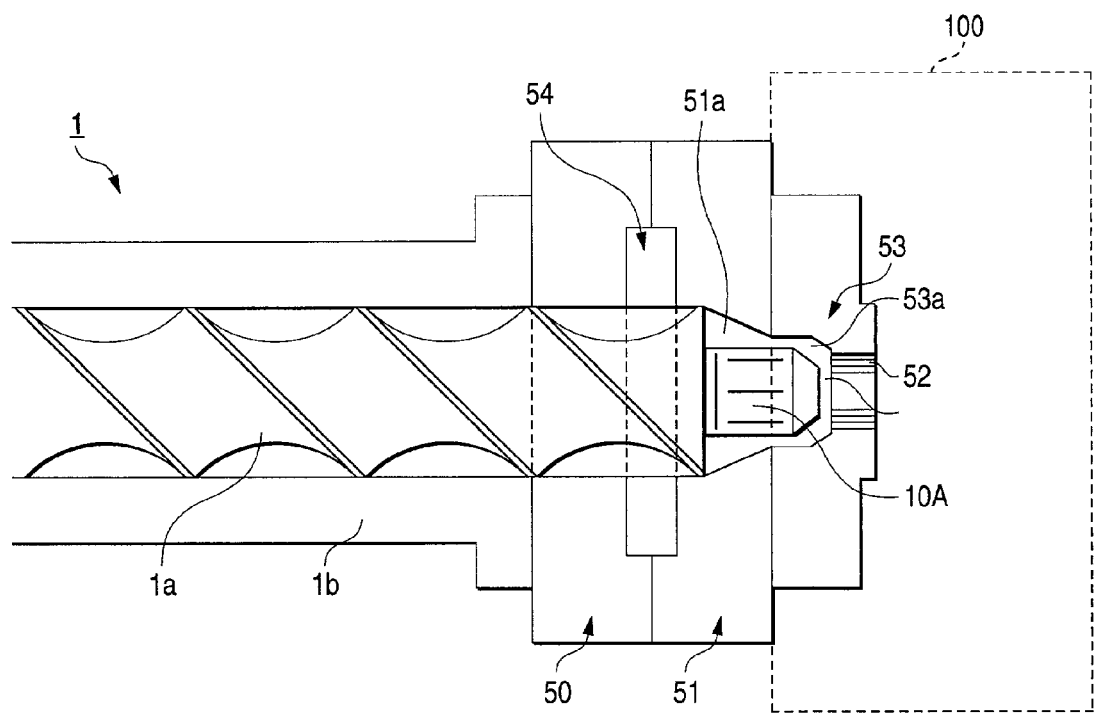
FIG. 2 is an enlarged sectional view of an essential part of FIG. 1.

As shown in FIG. 2, an adapter 50 and a die holder 51 are provided in an axially overlapped manner at a tip end of a cylinder 1b of the above mentioned twin screw type kneading and extruding machine 1, and a die 53 having a nozzle hole 52 is fitted to a tip end of this die holder 51. An annular breaker plate 54 is provided between the aforesaid adapter 50 and the die holder 51. This twin screw 1a passes through the adapter 50 and the breaker plate 54, and a distal end portion 1aA of this twin screw 1a passes through the die holder 51 to be guided into a recess 53a which communicates with the nozzle hole 52 of the die 53.

The aforesaid recess 53a communicates with a tapered recess 51a of the die holder 51, so that the mixed material fed through the breaker plate 54 may be fed to the nozzle hole 52 through these recesses 51a, 53a, under condition that least residence occurs.

In the apparatus 30 for making pellets of wood meal compound having such a structure as described above, production of the mixed material in which the wood meal is an additive material will be conducted as follows; Specifically, after those cylinders in the respective sections have been heated up to a predetermined temperature, the drive mechanism 31 is actuated to rotate the twin screw 1a in order to supply the mixed material consisting of the synthetic resin material and the wood meal material to the hopper 3.

This mixed material supplied to the hopper 3 is sequentially transported in a distal end direction, that is, in a downward direction by means of the rotating twin screw 1a, and at the same time, kneaded and melted with heat from the heated cylinders and shearing action by the rotating twin screw 1a.

The above described mixed material passes through the degassing cylinder 5 and then, kneaded and melted in the kneading section 6. In this kneading section 6, however, because the twin screw 1a is composed of the known screw having weak kneading ability, the synthetic resin material in the mixed material will not be rapidly melted, but will be kneaded in a long section (a length of the kneading section is made longer, because the side feeder is not employed) in a state where the synthetic resin has high viscosity and is susceptible to shearing action. Thereafter, the kneaded material will be extruded from the die 10 through the open vent section 7, the vacuum drawing vent section 8, and the extruding section 9. During kneading and melting of the mixed material, air, water content, and gas such as volatile component contained in the material will be naturally exhausted from the degassing cylinder 5 and the open vent 7. The gas which has not been naturally exhausted will be forcibly suctioned and exhausted from the vacuum drawing vent section 8 by means of a vacuum suction device which is not shown. The mixed material which has been sufficiently degassed will be extruded from the die 10 via the extruding section 9 as described above, and cut by the cutting device 100 which is connected to the die 10 thereby to obtain wood meal compound pellets made of the mixed material containing the wood meal. As the wood meal material, not only wet wood meal but dry wood meal can be used, and as for the type of the wood meal, this method can be applied not only to wood meal in flour form but to ordinary wood meal.

As the twin screw type kneading and extruding machine 1, besides the twin screw type, any type such as a single shaft type, an intermeshed twin screw type, a non-intermeshed twin screw type, a co-rotating type, a counter-rotating type can be employed. The screw having weak kneading ability in the kneading section 6 may be shaped to have a larger outer diameter than usual with a larger clearance between the outer diameter of the screw and an inner diameter of the cylinder.

Kneading discs in the kneading section 6 may be varied in their diameters according to viscosity of the synthetic resin material, and a preferable range of the screw clearance may be up to nine times larger than an ordinary clearance.

EXAMPLES

Employing an intermeshed co-rotating twin screw type kneading and extruding machine composed of twelve cylinders as shown in FIG. 1 and having an L/D=42 and a screw diameter of 69 mm, synthetic resin material mixed with wood meal has been produced from the same mixed material as described below, and the results obtained will be shown in the following table. Synthetic resin material:

Polypropylene (melt index: 17) pellet 50% by weight
Wood meal material:
  Water content: 7–8%, average particle diameter: 50 μm 50% by weight

TABLE 1

| screw rotation speed rpm | Discharging Capacity Kg/h | Discharging temp. °C. | Consumed Energy KWh/kg | Dispersion of Wood Meal | Bending Strength kg/cm² |
|---|---|---|---|---|---|
| 140 | 200 | 196 | 0.207 | few lumps | 490 |
| 170 | 200 | 205 | 0.211 | no lump | 520 |

Figure 3:
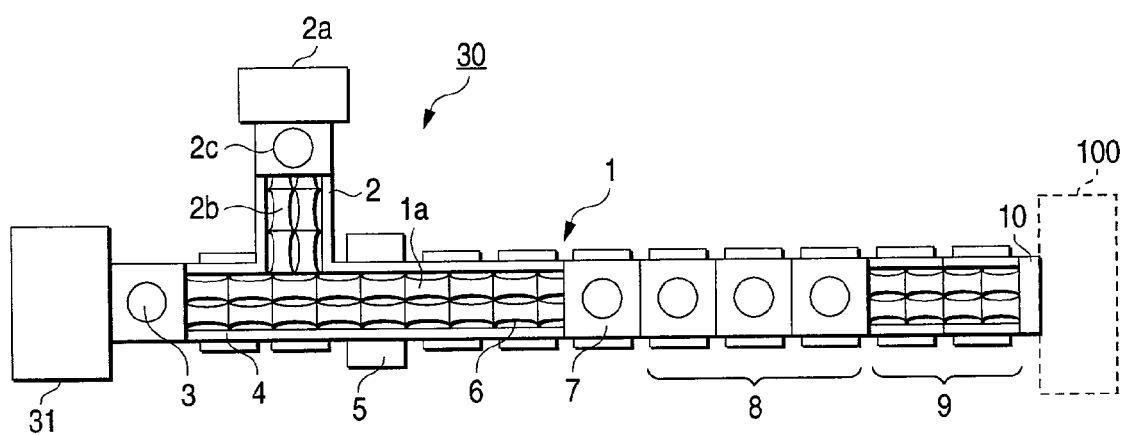
FIG. 3 is a plane view partly in section showing a screw type kneading and extruding machine in a conventional manufacturing apparatus.

As a comparative example, synthetic resin material mixed with wood meal has been produced from 50% by weight of polypropylene (pp) pellet having a melt index of 17 and 50% by weight of wood meal material having a water content of 7–8% and an average particle diameter of 50 μm, employing the conventional apparatus 30 for making pellets of wood meal compound as shown in FIG. 3, and the results obtained will be shown in the following table.

TABLE 2

| screw rotation speed rpm | Discharging Capacity kg/h | Discharging temp. °C. | Consumed Energy kWh/kg | Dispersion of Wood Meal | Bending Strength kg/cm² |
|---|---|---|---|---|---|
| 170 | 200 | 203 | 0.200 | many lumps | 405 |

Although polypropylene having a melt index of 17 has been used as the synthetic resin material in the above example, the larger melt index is, the lower viscosity will become. Therefore, in case of larger melt index, the material is not liable to receive shearing action of the screw, and it is predicted that difference in dispersion and bending strength will grow much larger.

Because the method and apparatus for making pellets of wood meal compound according to the present invention has the above described structure, the following advantages can be obtained.

(1) The synthetic resin material and the wood meal material are supplied into the hopper without employing a side feeder, and kneaded and melted under the weak kneading condition through the kneading section which has become longer since no side feeder is provided, whereby the synthetic resin material is kneaded over a long section in a state where it is susceptible to shearing action of the screw, and favorable properties can be obtained.

(2) As the results, the mixed material will be sufficiently kneaded and dispersed so that the wood meal material can be more uniformly mixed and dispersed, and the composite material having uniform strength has come to be produced.

(3) Because the synthetic resin and the wood meal material are supplied from the hopper at one position without employing the side feeder, production cost will be remarkably reduced.

(4) Use of the wet wood meal would save a drying process enabling the cost to be reduced, and use of flour of the wood meal would attain enhanced strength.

What is claimed is:

1. An apparatus for making pellets of wood meal compound comprising:
   a twin screw type kneading and extruding machine, including
      a hopper in a most upstream position;
      a degassing cylinder disposed in a downstream direction from said hopper;
      a kneading section disposed in a downstream direction from said degassing cylinder;
      an open vent disposed in a downstream direction from said kneading section;
      a vacuum drawing vent disposed in a downstream direction from said open vent;
      an adapter disposed in a downstream direction from said vacuum drawing vent;
      a breaker plate disposed in a downstream direction from said adapter;
      a die holder disposed in a downstream direction from said breaker plate;
      a cutting device disposed in a downstream direction from said die holder; and
      a twin screw having a continuous helical thread;
   wherein said hopper is configured so as to simultaneously supply a combination of a synthetic resin material and a wood meal material directly to an upstream side of the degassing cylinder; and
   wherein the twin screw penetrates through said adapter and said breaker plate and said continuous helical thread penetrates through said adapter and said breaker plate,
   wherein a distal end of said twin screw passes through said die holder into said die.

2. The apparatus according to claim 1, wherein said die includes a nozzle hole fitted to a tip end of the die holder.

3. The apparatus according to claim 2,
   wherein a distal end portion of the twin screw passes through the die holder to be guided into a recess that communicates with the nozzle hole of the die, and
   wherein the recess communicates with a tapered recess of the die holder such that material fed through the breaker plate is fed to the nozzle hole through these recesses under condition that least residence occurs.

* * * * *